United States Patent [19]
Gulick et al.

[11] Patent Number: 5,748,983
[45] Date of Patent: May 5, 1998

[54] COMPUTER SYSTEM HAVING A DEDICATED MULTIMEDIA ENGINE AND MULTIMEDIA MEMORY HAVING ARBITRATION LOGIC WHICH GRANTS MAIN MEMORY ACCESS TO EITHER THE CPU OR MULTIMEDIA ENGINE

[75] Inventors: Dale E. Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[21] Appl. No.: 474,554

[22] Filed: Jun. 7, 1995

[51] Int. Cl.$^6$ ................................................. G06F 13/00
[52] U.S. Cl. ...................... 395/842; 395/280; 395/800; 395/853
[58] Field of Search ............................. 327/108; 348/13, 348/8, 15; 369/124; 379/90; 395/280, 650, 440, 518, 507

[56] References Cited

U.S. PATENT DOCUMENTS

| | | | |
|---|---|---|---|
| 4,470,109 | 9/1984 | McNally | 395/280 |
| 4,549,273 | 10/1985 | Tin | 395/477 |
| 4,811,205 | 3/1989 | Normington et al. | 395/502 |
| 4,991,169 | 2/1991 | Davis et al. | 370/77 |
| 5,201,037 | 4/1993 | Kohiyama et al. | 395/518 |
| 5,325,423 | 6/1994 | Lewis | 379/90 |
| 5,373,493 | 12/1994 | Lizuka | 369/124 |
| 5,440,336 | 8/1995 | Buhro et al. | 348/13 |
| 5,450,544 | 9/1995 | Dixon et al. | 395/507 |
| 5,487,167 | 1/1996 | Dinallo et al. | 395/650 |
| 5,488,411 | 1/1996 | Lewis | 348/8 |
| 5,497,373 | 3/1996 | Hulen et al. | 370/259 |
| 5,508,940 | 4/1996 | Rossmere et al. | 364/514 A |
| 5,512,938 | 4/1996 | Ohno | 348/15 |
| 5,519,345 | 5/1996 | Farrell et al. | 327/108 |
| 5,535,339 | 7/1996 | Kim | 395/280 |
| 5,574,662 | 11/1996 | Windrem et al. | 364/514 R |
| 5,584,007 | 12/1996 | Ballard | 395/440 |

FOREIGN PATENT DOCUMENTS

| | | |
|---|---|---|
| 0 537 932 A3 | 4/1993 | European Pat. Off. |
| 94/10641 | 5/1994 | WIPO |

OTHER PUBLICATIONS

PCI Local Bus—*PCI Multimedia Design Guide*—Revision 1.0 —Mar. 29, 1994, 43 pages.

*Primary Examiner*—Thomas C. Lee
*Assistant Examiner*—Po C. Huang
*Attorney, Agent, or Firm*—Conley, Rose & Tayon; Jeffrey C. Hood

[57] ABSTRACT

A computer system optimized for real-time applications which provides increased performance for real-time applications over current computer architectures. The system includes a dedicated multimedia engine coupled directly to the main memory which performs real-time operations, including audio and video functions, as well as others. The multimedia engine includes one or more DSP engines which couple through one or more I/O channels to respective video, audio and communication ports. The multimedia engine includes video ports for coupling to a video monitor, audio ports for coupling to speakers and one or more communication ports. Multimedia memory is coupled to the local memory bus and stores data for the multimedia engine. The multimedia memory in the multimedia engine comprises a portion of the main memory address space. Thus the multimedia is used for real-time or multimedia data and is also used by the CPU as overflow memory space.

15 Claims, 6 Drawing Sheets

COMPUTER SYSTEM HAVING A DEDICATED MULTIMEDIA ENGINE AND MULTIMEDIA MEMORY HAVING ARBITRATION LOGIC WHICH GRANTS MAIN MEMORY ACCESS TO EITHER THE CPU OR MULTIMEDIA ENGINE

FIELD OF THE INVENTION

The present invention relates to a computer system having a dedicated multimedia engine coupled to the main memory and a look-aside multimedia memory that shares a common address space with the main memory, wherein the multimedia engine provides improved performance for real-time applications.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modem personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system.

In many cases, multimedia hardware cards situated on an expansion bus do not have the required access to system memory and other system resources for proper operation. For example, a multimedia hardware card situated on the PCI expansion bus must first arbitrate for control of the PCI bus before the device can access system memory. In addition, since the computer system architecture is not optimized for multimedia, multimedia hardware cards generally do not make efficient use of system resources. As an example, multimedia hardware cards typically include their own memory in addition to system memory. For example, video accelerator cards are typically configured with one to four Megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia applications as well as for non-realtime applications.

SUMMARY OF THE INVENTION

The present invention comprises a computer system optimized for real-time applications which provides increased performance over current computer architectures. The system includes a dedicated multimedia engine coupled directly to the main memory which performs a number of real-time operations, including audio and video functions, as well as others. A separate memory is also coupled to the main memory and to the multimedia engine and stores multimedia data. The computer system of the present invention provides much greater performance for real-time applications than prior systems.

The computer system includes a CPU coupled through chip set or bridge logic to main memory. The bridge logic also couples to a local expansion bus such as the PCI bus. Various devices may be connected to the PCI bus, including a hard drive, network interface card, etc. The bridge logic and main memory are also coupled through a local bus to a dedicated multimedia engine. Thus the multimedia engine is coupled directly to the main system memory, thus allowing more efficient access to real time data.

In the preferred embodiment, a separate multimedia memory and associated arbitration logic are situated locally to the multimedia engine. The multimedia memory may reside either in the multimedia engine or external to the engine. The multimedia memory is configured in a "look-aside" fashion, and the arbitration logic arbitrates between the CPU and the multimedia engine for multimedia memory access. A DMA engine is preferably included in the arbitration logic which performs high speed burst transfers between the main memory and the multimedia memory. Alternatively, the multimedia engine transfers data from the main memory to the multimedia memory prior to performing operations on the data. In the preferred embodiment, the multimedia memory in the multimedia engine comprises the same address space as the main memory.

The multimedia engine includes one or more DSP engines. The DSP engines may comprise either dedicated audio or video engines or general purpose DSP engines. The one or more DSP engines couple through one or more I/O channels to respective I/O ports, including video, audio and communication ports. The multimedia engine includes video ports for coupling to a video monitor, audio ports for coupling to an audio DAC or speakers, and one or more communication ports.

The CPU writes video and/or audio commands and data to the main memory, and the DMA engine or multimedia engine retrieves the commands and data from main memory into the multimedia memory. The CPU writes video and/or audio commands and data to the main memory instead of directly to the multimedia memory to minimize CPU access to the multimedia memory. This ensures that the DSP engine has full access to the multimedia memory. Thus the multimedia engine is not "locked out" of the multimedia memory due to CPU writes.

In an embodiment including a DMA engine, the CPU and the DMA engine arbitrate for the main memory. In an embodiment which does not include a DMA engine, the CPU and the multimedia engine arbitrate for the main memory. In each embodiment, the CPU and the multimedia engine both arbitrate for the multimedia memory. In general, the CPU has priority access to the main memory, and the multimedia engine has priority access to the multimedia memory.

Therefore, the present invention comprises a novel computer system architecture which increases the performance of real-time applications. A dedicated multimedia engine and a multimedia memory are coupled directly to the main memory. The multimedia memory comprises part of the main memory address space, and this allows the multimedia memory to be used for multimedia data as well as for additional main memory storage.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

*PCI System Architecture* by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

Computer System Block Diagram

Figure 1:
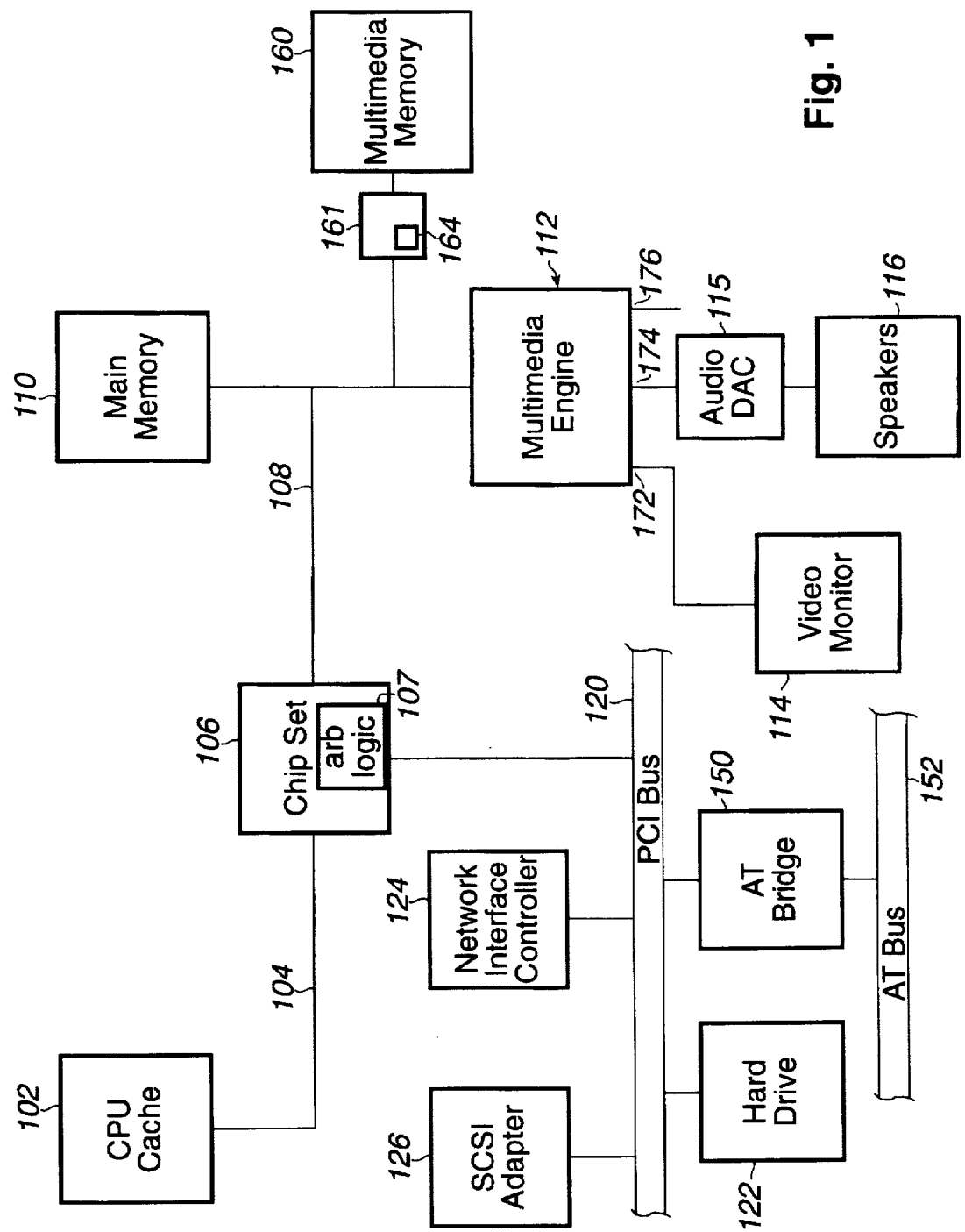
FIG. 1 is a block diagram of a computer system including a multimedia engine and a multimedia memory according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset 106. The chipset includes arbitration logic 107 as shown. The chipset 106 is preferably similar to the Triton chipset available from Intel Corporation, including certain arbiter modifications to accommodate the multimedia engine of the present invention. A second level or L2 cache memory (not shown) may be coupled to a cache controller in the chipset, as desired. The bridge or chipset 106 couples through a memory bus 108 to main memory 110. The main memory 110 is preferably DRAM (dynamic random access memory) or EDO (extended data out) memory, as desired.

The host/PCI/cache bridge 106 and the main memory 110 also couple through the memory bus 108 to the multimedia engine 112 according to the present invention. The multimedia engine 112 performs video and audio processing functions. As shown, the multimedia engine 112 preferably includes a video port 172 for coupling to a video monitor 114 and an audio port 174 which couples through an audio digital to analog converter (audio DAC) 115 to speakers 116. The audio DAC 115 includes a D/A converter, such as those available from Crystal Semiconductor of Austin, Tex. The multimedia engine 112 may also include a communications port.

Figure 6:
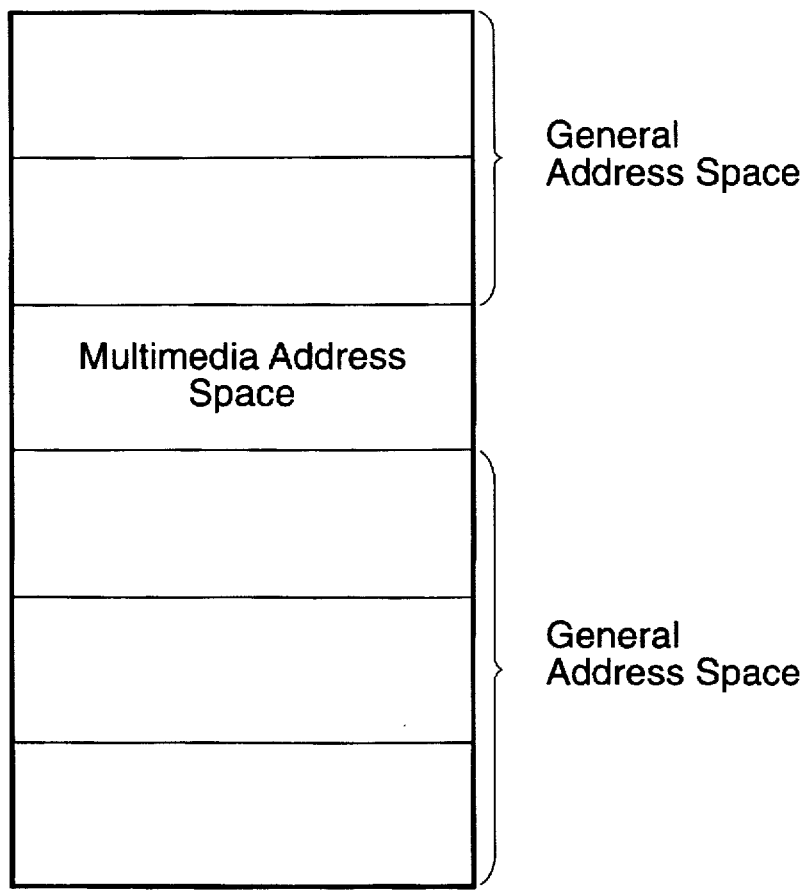
FIG. 6 illustrates the memory address space of the main memory and the multimedia memory.

A multimedia memory 160 is coupled through an arbiter block 161 to the local bus 108. The multimedia memory 160 preferably comprises DRAM (dynamic random access memory) or high speed SRAM. However, the multimedia memory 160 may comprise any of various types of memories. In the preferred embodiment, the multimedia memory 160 is mapped to the main memory address space and thus comprises a portion of the main memory address space, as shown in FIG. 6. Thus the multimedia memory 160 is available to store non-multimedia data as needed. In other words, if the main memory 110 becomes full and additional memory is needed, the CPU 102 can store code and data in the multimedia memory 160. Thus, the multimedia memory 160 is used for real-time or multimedia data and is also used by the CPU 102 as overflow memory space.

As described further below, the arbiter block 161 performs arbitration between the CPU 102 and the multimedia engine 112 for the multimedia memory. The arbiter logic 151 preferably includes a DMA (direct memory access) engine which performs transfers between the main memory 110 and the multimedia memory 160.

The host/PCI/cache bridge or chipset 106 also interfaces to a peripheral component interconnect (PCI) bus 120. In the preferred embodiment, a PCI local bus is used. However, it is noted that other local buses may be used, such as the VESA (Video Electronics Standards Association) VL bus. Various types of devices may be connected to the PCI bus 120. In the embodiment shown in FIG. 1, a hard disk 122 and a network interface controller 124 are coupled to the PCI bus 120. A SCSI (small computer systems interface) adapter 126 may also be coupled to the PCI bus 120, as shown. The SCSI adapter 126 may couple to various SCSI devices, such as a CD-ROM drive and a tape drive (both not shown), as desired. Various other devices may be connected to the PCI bus 120, as is well known in the art.

Expansion bus bridge logic 150 is also preferably coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown). The expansion bus bridge logic 150 also couples to a peripheral expansion bus (not shown). The peripheral expansion bus is used for connecting various peripherals to the computer system, including an interrupt system, a real time clock (RTC) and timers, a direct memory access (DMA) system, and ROM/Flash memory (all not shown). Other peripherals (not shown) are preferably connected to the peripheral expansion bus, including communications ports, diagnostics ports, command/status registers, and non-volatile static random access memory (NVSRAM).

Multimedia Engine Block Diagram

Figure 2:
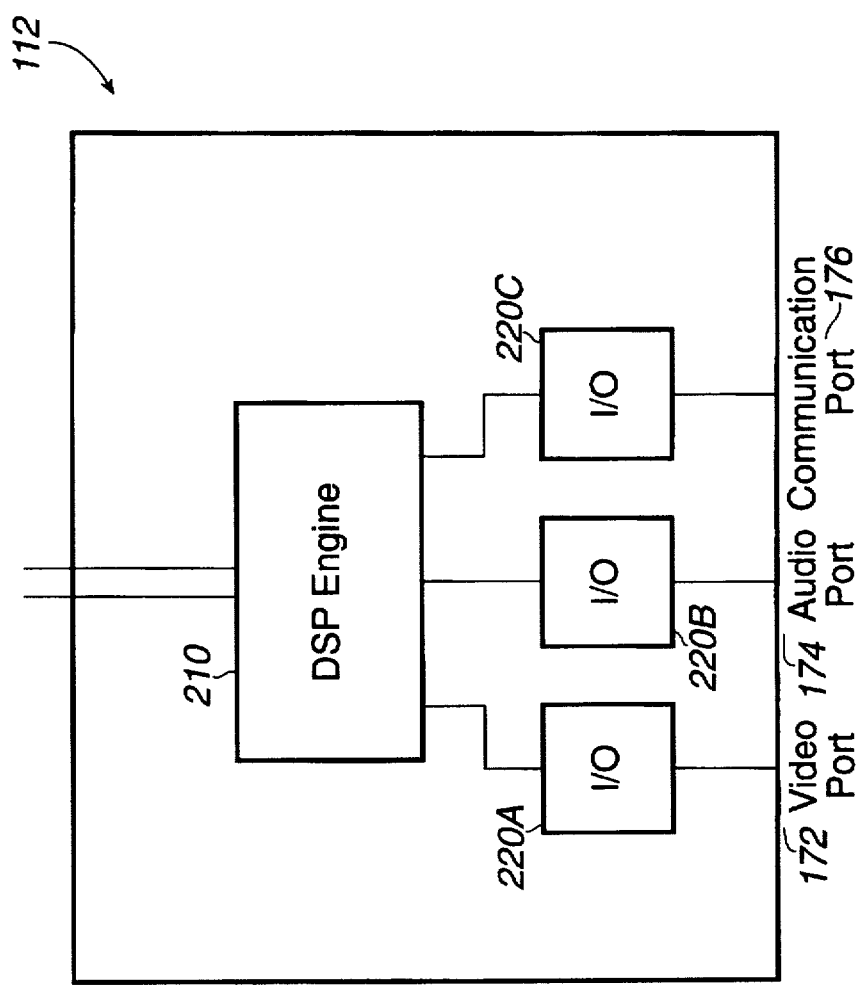
FIG. 2 is a block diagram of the multimedia engine of FIG. 1.

Referring now to FIG. 2, a more detailed block diagram illustrating the multimedia engine 112 is shown. In the preferred embodiment shown in FIG. 2, the multimedia engine 112 includes one DSP engine 210 which preferably performs video and audio processing functions. In the preferred embodiment, the DSP engine 210 is a general purpose DSP engine that performs both video and audio processing functions as well as other real-time functions. In one embodiment, the DSP engine 210 includes one or more ROMs (not shown) which store microcode corresponding to video and audio processing instructions or commands. The DSP engine 210 preferably performs video and graphics functions such as polygon rendering and texture mapping, among others. The DSP engine 210 preferably performs audio functions such as MIDI and wavetable synthesis, among others. The DSP engine 210 may also perform communication functions, such as ISDN connectivity or modem functionality, as desired.

Alternate embodiments of the multimedia engine 112 include two or more DSP engines. The embodiment shown in FIG. 3 includes three separate hardware engines, including a video or graphics accelerator engine 212, an audio engine 214, and a communications or modem engine 216.

Referring again to FIG. 2, the one or more DSP engines 210 couple to one or more I/O channels 220. In the preferred embodiment shown in FIG. 2, the multimedia engine 112 includes three I/O channels 220A, 220B, and 220C. I/O channel 220A is preferably a dedicated video channel and couples to video port outputs 172 of the multimedia engine 112. I/O channel 220B is preferably a dedicated audio channel and couples to audio port 174 of the multimedia engine 112. I/O channel 220C couples to communication port 176 of the multimedia engine 112. In one embodiment, the video and audio I/O channels 220A and 220B are synchronized with each other to ensure synchronized audio and video during multimedia presentations.

In the preferred embodiment, the multimedia engine 112 includes video processing circuitry and/or firmware, including a random access memory digital to analog converter (RAMDAC), for converting video data into appropriate analog signals, preferably red, green and blue (RGB) signals, for output directly to video monitor 114. In an alternate embodiment, the DSP engine 210 provides digital video pixel data through I/O channel 220A to the video port 172, and a separate RAMDAC and associated logic circuitry (not shown) receives the video pixel data from the video port 172 and generates the appropriate RGB signals to drive the display monitor 114.

In the preferred embodiment, the DSP engine 210 generates digital audio data that is provided through the I/O channel 220B to the audio port 174. A separate audio digital to analog converter (audio DAC) (115 FIG. 1) is preferably connected to the audio port 174 and converts the digital audio data to the appropriate analog signals to drive one or more speakers 116. Alternatively, the audio DAC functions are included within the multimedia engine 112.

Alternate Embodiment

Figure 4:
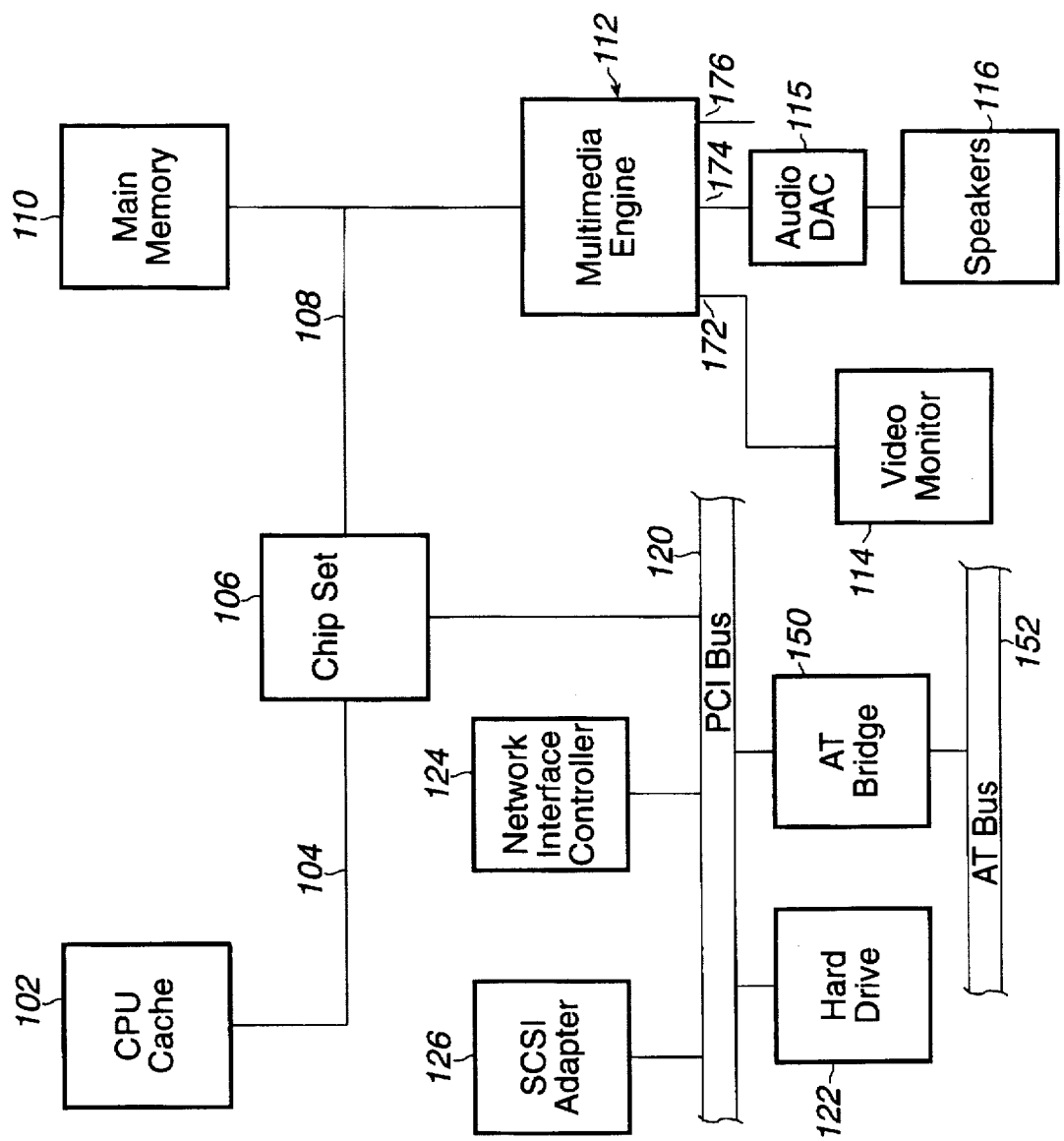
FIG. 4 is a block diagram of an alternate embodiment of the computer system of FIG. 1 including a multimedia engine according to the present invention.
Figure 5:
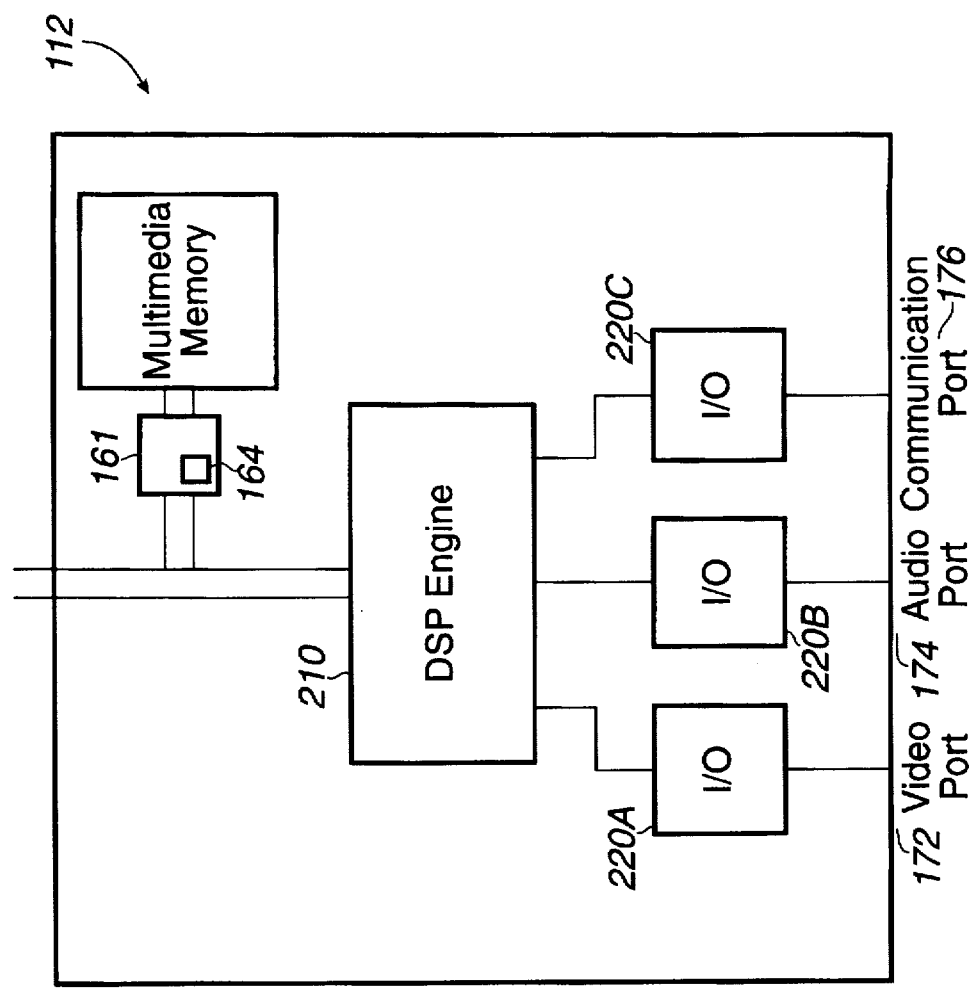
FIG. 5 is a block diagram of the multimedia engine of FIG. 4.

FIGS. 4 and 5 illustrate an alternate embodiment of the computer system and multimedia engine of FIG. 1, wherein the multimedia memory 160 is comprised in the multimedia engine 112 instead of external to the multimedia engine 112. In this embodiment, the multimedia memory 160 couples through the arbiter logic 161 to an internal bus inside the multimedia engine 112. The arbiter logic 161 preferably includes DMA transfer engine 164, as shown.

Computer System Operation

Referring again to FIG. 1, in the preferred embodiment, the main memory 110 stores the operating system and applications software as well as driver software, including video drivers and audio drivers. The CPU 102 executes applications software and driver software from the main memory 110 and writes any associated video and audio data to the main memory 110. The CPU 102 then provides high level instructions directly to the multimedia memory 160 and/or to the DMA engine 164, or to the multimedia engine 112.

In one embodiment, the CPU 102 provides the high level instructions directly to the multimedia memory 160. In this embodiment, the DMA engine 164 accesses the high level instructions from a designated address space of the multimedia memory 160 and uses the instructions to retrieve the video or audio data from main memory 110 and store the data in the multimedia memory 160. In an alternate embodiment, the CPU 102 provides the high level instructions directly to one or more buffers or registers in the DMA engine 164 instead of to the multimedia memory 160. In this embodiment, the DMA engine 164 uses the high level instructions received from the CPU 102 to transfer the video or audio data from main memory 110 to the multimedia memory 160. It is noted that this embodiment does not require the DMA engine 164 to access the multimedia memory 160 for these instructions.

In an embodiment which does not include the DMA engine 164, the multimedia engine 112 accesses the high level instructions from the multimedia memory 160 and uses these high level instructions to transfer the video or audio data from main memory 110 to the multimedia memory 160. Alternatively, the CPU 102 provides the high level instructions directly to buffers or registers in the multimedia engine 112, and the multimedia engine 112 uses these instructions to transfer the data from the main memory 110 to the multimedia memory 160.

In the preferred embodiment, the high level instructions provided from the CPU 102 also include the actual graphical and/or audio commands used by the DSP engine 210 to process the video or audio data and to produce the appropriate signals at the video and audio ports 172 and 174.

In one embodiment, the CPU 102 writes video and/or audio instructions or commands to the main memory 110 in conjunction with the corresponding video and audio data. In this embodiment, the CPU 102 writes only pointer information to the multimedia memory 160 or DMA engine 164 which points to the beginning address in main memory 110 where the data and commands reside. The pointer information includes the beginning address of the data, the length or number of bytes of the data, as well as other information.

In an embodiment including the DMA engine 164, the DMA engine 164 uses the pointer information to retrieve the commands and data from main memory 110 into multimedia memory 160. The DMA engine 164 preferably reads the pointer information from a designated address space in the multimedia memory 160, or from its internal buffers, and retrieves the commands and data from the main memory 110 to the multimedia memory 160 using high speed burst transfers.

The CPU 102 preferably writes video and/or audio commands and data to the main memory 110 instead of directly to the multimedia memory 160 in order to minimize CPU accesses to the multimedia memory 160. This ensures that the DSP engine 210 has full access to the multimedia memory 160 for real-time processing. Further, the DMA engine 164 and/or the multimedia engine 112 retrieves commands and data from the main memory 110 only when necessary, and the DSP engine 210 is not "locked out" of the multimedia memory 160 due to CPU writes to the multimedia memory 160.

In an alternate embodiment, the CPU 102 writes video and/or audio data and commands directly to the multimedia memory 160. In this embodiment, the CPU executes applications software and driver software from the main memory 110 and writes any associated video and audio data directly to the multimedia memory 160. The driver software also writes high level commands directly to the multimedia memory 160. Thus, the video drivers write high level commands to the multimedia memory 160 in a similar manner to current PCI-based graphics acceleration cards.

In one embodiment, the multimedia memory 160 is separated into two or more address spaces or buffers, and the CPU 102 writes to one address space or buffer while the DSP engine 210 accesses commands and data from the other address space or buffer. This ensures that the DSP engine 210 has uninterrupted access to commands and data in the multimedia memory 160 while also allowing the CPU 102 to directly write real-time commands and data to the multimedia memory 160.

Figure 3:
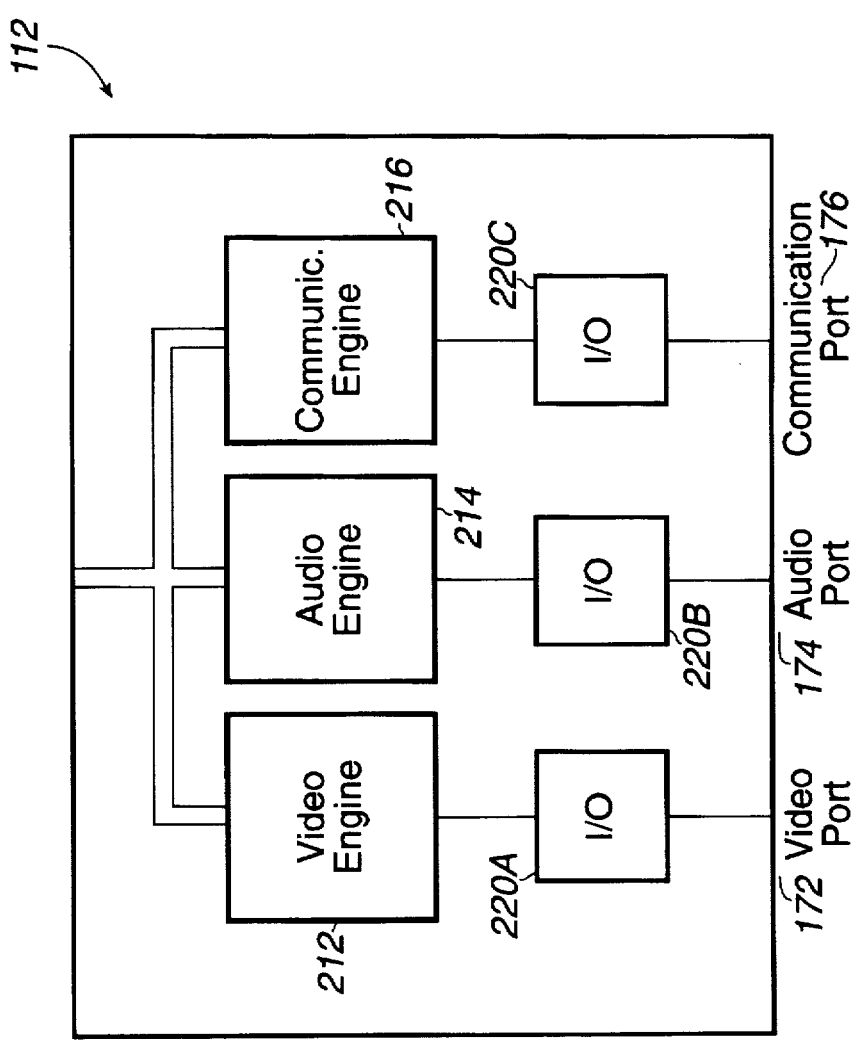
FIG. 3 is a block diagram of an alternate embodiment of the multimedia engine of FIG. 1.

Once real-time or multimedia data and commands have been placed in the multimedia memory 160, either by the CPU 102 or retrieved from main memory 110, the one or more DSP engines 210 in the multimedia engine 112 read the commands and data from the multimedia memory 160 and perform the necessary graphics and audio processing functions to generate the appropriate video and audio signals to the video and audio ports 172 and 174. In one embodiment, the multimedia memory 160 is partitioned into separate address spaces for commands and data, and the DSP engine 210 retrieves commands from a first address space and retrieves data from a second address space. In the embodiment of FIG. 3, the multimedia memory 160 can be further split, having a separate address space for each of the engines 212, 214 and 216.

Arbitration Logic

The chipset 106 preferably includes arbitration logic 107 which determines access to the main memory 110. The arbitration logic 107 is coupled to the CPU 102, the main memory 110 and the multimedia engine 112. In an embodiment including the DMA engine 164, the arbitration logic 107 receives bus requests from each of the CPU 102 and the DMA engine 164 and grants main memory access to either of the CPU 102 or the DMA engine 164. In an embodiment which does not include the DMA engine 164, the arbitration logic 107 receives bus requests from each of the CPU 102 and the multimedia engine 112 and grants main memory access to either of the CPU 102 or the multimedia engine 112. In the preferred embodiment, the CPU 102 has priority access to the main memory 110.

As mentioned above, the main memory 110 and the multimedia memory 160 preferably share a common address space. FIG. 6 illustrates the main memory address space, wherein the multimedia memory 160 comprises part of the main memory address space. Thus the multimedia memory 160 is available to store non-multimedia data as needed. Accordingly, the multimedia engine 112 and CPU 102 must also arbitrate for access to the multimedia memory 160. The arbiter 161 handles the arbitration for the multimedia memory 160. The multimedia engine 112 preferably has priority access to the multimedia memory 160.

In one embodiment, the multimedia engine 112 simply writes one or more bits to a register in the arbiter 161 to gain control of the multimedia memory 160, and the CPU 102 is only granted access to the multimedia memory 160 after a certain starvation period. Alternatively, the local bus 108 is an isochronous bus where each of the CPU 102 and the multimedia engine 112 have guaranteed bandwidth and latency on the bus 108 to the main memory 110. Alternative arbitration schemes such as a round robin or priority based scheme may be used as desired.

In an alternate embodiment, the arbiter 161 is not present, and arbitration for both the main memory 110 and the multimedia memory 160 is performed by the arbitration logic 107 in the chipset 106. This embodiment is considered less desirable since this dual arbitration to the arbitration logic 107 may impact the ability of the multimedia engine 112 to access commands and data from the multimedia memory 160 while the CPU 102 is accessing main memory 110.

Conclusion

Therefore, the present invention comprises a novel computer system architecture which increases the performance of real-time applications. A dedicated multimedia engine is coupled directly to the main memory, and the multimedia engine includes dedicated multimedia memory which is part of the main memory address space. This allows the multimedia memory to be used for multimedia data as well as for additional main memory storage.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:

a CPU;

chip set logic coupled to the CPU, wherein the chip set logic includes arbitration logic for coupling to a memory bus, and wherein the chip set logic includes expansion bus bridge logic for coupling to an expansion bus;

an expansion bus coupled to the chip set logic;

one or more peripheral devices coupled to the expansion bus;

a memory bus coupled to the chip set logic;

main memory coupled to the memory bus which stores data accessible by the CPU;

multimedia memory coupled to the memory bus for storing multimedia data;

a direct memory access engine coupled to said memory bus, wherein said direct memory access engine retrieves data from said main memory and stores said data in said multimedia memory;

a multimedia engine coupled to the memory bus, wherein said multimedia engine comprises:

one or more DSP engines coupled to said memory bus, wherein said one or more DSP engines process said multimedia data stored in said multimedia memory;

one or more input/output channels coupled to said one or more DSP engines for transmitting data;

a video port coupled to at least one of said one or more input/output channels, wherein said video port is adapted for coupling to a video monitor;

an audio port coupled to at least one of said one or more input/output channels, wherein said audio port is adapted for transferring audio data;

arbitration logic coupled between said memory bus and said multimedia memory, wherein said arbitration logic receives multimedia memory access requests from each of said CPU and said multimedia engine and grants multimedia memory access to either of said CPU or said multimedia engine; and second arbitration logic coupled to said CPU and said memory bus, wherein said second arbitration logic receives main memory access requests from each of said CPU and said direct memory access engine and grants main memory access to either of said CPU or said direct memory access engine.

2. A computer system, comprising:

a CPU;

a bus, wherein said CPU is coupled to said bus main memory coupled to said bus which stores data accessible by the CPU;

multimedia memory coupled to said bus for storing multimedia data;

a direct memory access engine coupled to said multimedia memory and said bus, wherein said direct memory access engine retrieves data from said main memory and stores said data in said multimedia memory;

a multimedia engine coupled to said bus, wherein said multimedia engine comprises:

one or more DSP engines coupled to said bus, wherein said one or more DSP engines process said multimedia data stored in said multimedia memory;

one or more input/output channels coupled to said one or more DSP engines for transmitting data;

a video port coupled to at least one of said one or more input/output channels, wherein said video port is adapted for coupling to a video monitor; and an audio port coupled to at least one of said one or more input/output channels, wherein said audio port is adapted for transferring audio data;

arbitration logic coupled between said bus and said multimedia memory, wherein said arbitration logic receives multimedia memory access requests from each of said CPU and said multimedia engine and grants multimedia memory access to either of said CPU or said multimedia engine; and second arbitration logic coupled to said CPU and said bus, wherein said second arbitration logic receives main memory access requests from each of said CPU and said direct memory access engine and grants main memory access to either of said CPU or said direct memory access engine.

3. The computer system of claim 2, wherein said CPU is adapted for generating addresses within an address space, wherein said memory for storing multimedia data and said main memory are addressable within said address space.

4. The computer system of claim 3, wherein said address space includes a first address space portion and a second address space portion, wherein said multimedia data is stored only in said second address space portion.

5. The computer system of claim 2, wherein said memory for storing multimedia data and said main memory comprise a common address space.

6. The computer system of claim 2, further comprising:

a second direct memory access engine coupled to said multimedia memory and said bus, wherein said second direct memory access engine retrieves data from said main memory and stores said data in said multimedia memory.

7. The computer system of claim 6, wherein said second direct memory access engine includes one or more registers for storing commands received from said CPU, wherein said second direct memory access engine uses said commands to retrieve data from said main memory and store said data in said multimedia memory.

8. The computer system of claim 2, wherein at least one of said one or more DSP engines comprises a video engine for manipulating video data.

9. The computer system of claim 8, wherein at least one of said one or more input/output channels is coupled between said video engine and said video port and transfers video data from said video engine to said video port.

10. The computer system of claim 2, wherein at least one of said one or more DSP engines comprises an audio engine for manipulating audio data.

11. The computer system of claim 10, wherein at least one of said one or more input/output channels is coupled between said audio engine and said audio port and transfers audio data from said audio engine to said audio port.

12. The computer system of claim 2, wherein said multimedia engine accesses data from said multimedia memory to perform multimedia operations;

wherein said CPU accesses data from said main memory concurrently with said multimedia accessing data from said multimedia memory.

13. A computer system, comprising:

a CPU;

a bus, wherein said CPU is coupled to said bus main memory coupled to said bus which stores data accessible by the CPU;

multimedia memory coupled to said bus for storing multimedia data;

a direct memory access engine coupled to said multimedia memory and said bus, wherein said direct memory access engine retrieves data from said main memory and stores said data in said multimedia memory;

a multimedia engine coupled to said bus, wherein said multimedia engine comprises:

one or more DSP engines coupled to said bus, wherein said one or more DSP engines process said multimedia data stored in said multimedia memory; and one or more input/output channels coupled to said one or more DSP engines for transmitting data;

arbitration logic coupled between said bus and said multimedia memory, wherein said arbitration logic receives multimedia memory access requests from each of said CPU and said multimedia engine and grants multimedia memory access to either of said CPU or said multimedia engine; and second arbitration logic coupled to said CPU and said bus, wherein said second arbitration logic receives main memory access requests from each of said CPU and said DMA engine and grants main memory access to either of said CPU or said DMA engine;

wherein said main memory and said memory for storing multimedia data comprise a common address space.

14. The computer system of claim 13, wherein said common address space includes a first address space portion and a second address space portion, wherein said multimedia data is stored only in said second address space portion.

15. The computer system of claim 13, further comprising:

a second direct memory access engine coupled to said multimedia memory and said bus, wherein said second direct memory access engine retrieves data from said main memory and stores said data in said multimedia memory.

* * * * *